US012498695B2

(12) United States Patent
Rajendran et al.

(10) Patent No.: US 12,498,695 B2
(45) Date of Patent: Dec. 16, 2025

(54) SYSTEMS AND METHODS FOR PLANT EQUIPMENT CONDITION MONITORING

(71) Applicant: Ford Motor Company, Dearborn, MI (US)

(72) Inventors: Harishankar Rajendran, Tamil Nadu (IN); Chandra Sekhar Jalluri, Canton, MI (US); B. Sai Kishore, Telangana (IN); Jasper Blackful, Southfield, MI (US); Loren Gardner, Livonia, MI (US); Nimalkumar Sundarakumar, Tamil Nadu (IN); Mike Walker, Grosse Ile, MI (US); Paul Christopher Shaw, Amherstburg (CA); Dan Accetta, LaSalle (CA); V. Raghavan, Tamil Nadu (IN); Richard James Furness, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 561 days.

(21) Appl. No.: 17/975,058

(22) Filed: Oct. 27, 2022

(65) Prior Publication Data

US 2023/0266738 A1 Aug. 24, 2023

(51) Int. Cl.
*G05B 19/4063* (2006.01)
*G05B 19/402* (2006.01)

(52) U.S. Cl.
CPC ....... *G05B 19/4063* (2013.01); *G05B 19/402* (2013.01)

(58) Field of Classification Search
None
See application file for complete search history.

(56) References Cited

U.S. PATENT DOCUMENTS

| | | | |
|---|---|---|---|
| 9,458,835 B2 | 10/2016 | Ikeda et al. | |
| 10,570,887 B2 | 2/2020 | Son et al. | |
| 10,599,982 B2 | 3/2020 | Pal et al. | |
| 10,795,337 B2 | 10/2020 | Bowers et al. | |
| 2019/0332958 A1* | 10/2019 | Subhankar | G01N 29/4454 |

OTHER PUBLICATIONS

Didier, Gaëtan, et al. "Fault detection of broken rotor bars in induction motor using a global fault index." IEEE Transactions on industry applications 42.1 (2006): 79-88. (Year: 2006).*
Chatterjee, Sourav Kumar. "Get the Most out of Vibration Analysis." Chemical Engineering 118.1 (2011). (Year: 2011).*
(Continued)

*Primary Examiner* — Carlos R Ortiz Rodriguez
(74) *Attorney, Agent, or Firm* — Burris Law, PLLC

(57) ABSTRACT

A method includes obtaining unprocessed data from a plurality of sensors mounted on one or more plant equipment, normalizing the unprocessed data to generate normalized data, converting the unprocessed data from a time domain to a frequency domain to generate a frequency domain signal, detecting a performance anomaly associated with the one or more plant equipment based on the normalized data and a change index routine, and determining a primary cause from among one or more causes of the performance anomaly based on the frequency domain signal and one or more rules.

20 Claims, 4 Drawing Sheets

(56) References Cited

OTHER PUBLICATIONS

Jung, Junyeong, et al. "Electrical monitoring of mechanical looseness for induction motors with sleeve bearings." IEEE Transactions on Energy Conversion 31.4 (2016): 1377-1386. (Year: 2016).*
Hemati, Ali, and Alireza Shooshtari. "Gear pump root cause failure analysis using vibrations analysis and signal processing." Journal of Failure Analysis and Prevention 20 (2020): 1815-1818. (Year: 2020).*
Kim, Heesoo, et al. "Rotordynamic simulation method of induction motors including the effects of unbalanced magnetic pull." IEEE access 8 (2020): 21631-21643. (Year: 2020).*
Saadawia, et al., SVM-based Fault Diagnosis System for Materials Change Detection, Chair of Dynamics and Control, University of Duisburg-Essen, pp. 1-4.

* cited by examiner

SYSTEMS AND METHODS FOR PLANT EQUIPMENT CONDITION MONITORING

CROSS-REFERENCE TO RELATED APPLICATIONS

Field

The present disclosure relates to systems and methods for monitoring plant equipment.

Background

The statements in this section merely provide background information related to the present disclosure and may not constitute prior art.

Typically, a production plant, such as a production plant for the production of automotive vehicles, includes plant equipment. The plant equipment may include at least one of a machine or plant asset, such as a drive motor, a pump, a gear box, a fan, a conveyor, a robot arm, etc. Failure of the plant equipment leads to an unscheduled cessation of the production of the automotive vehicles. Due to the unscheduled cessation, the number of automotive vehicles produced in a predefined amount of time is inhibited. In other words, an average time for the production of an automotive vehicle increases. As a result, the unscheduled cessation of automotive production causes significant decrease in the revenue of the production plant. Thus, a maintenance strategy is employed at the production plant to monitor the condition of the plant equipment. The maintenance strategy is employed to inhibit the failure of the plant equipment and to eliminate the unscheduled cessation of automotive production.

SUMMARY

This section provides a general summary of the disclosure and is not a comprehensive disclosure of its full scope or all of its features.

The present disclosure provides a method comprising obtaining unprocessed data from a plurality of sensors mounted on one or more plant equipment, normalizing the unprocessed data to generate normalized data, converting the unprocessed data from a time domain to a frequency domain to generate a frequency domain signal, detecting a performance anomaly associated with the one or more plant equipment based on the normalized data and a change index routine, and determining a primary cause from among one or more causes of the performance anomaly based on the frequency domain signal and one or more rules.

In one form, the method further includes identifying one or more harmonic peaks of the frequency domain signal, where the one or more rules are further based on the one or more harmonic peaks.

In one form, in response to the one or more harmonic peaks corresponding to a fundamental frequency, the primary cause is associated with a looseness of a part of the one or more plant equipment. In one form, in response to the one or more harmonic peaks corresponding to a fundamental frequency and a second harmonic, the primary cause is associated with a misalignment of the one or more plant equipment. In one form, in response to the one or more harmonic peaks corresponding to only a fundamental frequency, the primary cause is associated with a structural looseness of a part of the one or more plant equipment. In one form, in response to (i) the one or more harmonic peaks corresponding to a third harmonic and a fourth harmonic and (ii) an amplitude of the fourth harmonic is greater than an amplitude of the third harmonic, the primary cause is associated with a misalignment of the one or more plant equipment. In one form, in response to the one or more harmonic peaks corresponding to a number of gear teeth, the primary cause is associated with one of a gear misalignment and a gear meshing of the one or more plant equipment. In one form, in response to the one or more harmonic peaks corresponding to a number of rotor bars, the primary cause is associated with a motor issue of the one or more plant equipment. In one form, in response to the one or more harmonic peaks corresponding to a harmonic associated with a predetermined frequency, the primary cause is associated with a bearing issue of the one or more plant equipment.

In one form, the normalized data includes a root mean square (RMS) velocity value, an RMS acceleration value, a peak velocity value, a peak acceleration value, or a combination thereof. In one form, the method further includes performing a noise cancellation routine on the unprocessed data to generate the normalized data. In one form, the unprocessed data includes velocity data, acceleration data, or a combination thereof. In one form, the change index routine is based on one of a statistical model and a machine learning model.

The present disclosure provides a system including one or more processors and one or more nontransitory computer-readable mediums storing instructions that are executable by the one or more processors. The instructions include obtaining unprocessed data from a plurality of sensors mounted on one or more plant equipment, normalizing the unprocessed data to generate normalized data, converting the unprocessed data from a time domain to a frequency domain to generate a frequency domain signal, identifying one or more harmonic peaks of the frequency domain signal, detecting a performance anomaly associated with the one or more plant equipment based on the normalized data and a change index routine, and determining a primary cause from among one or more causes of the performance anomaly based on the one or more harmonic peaks and one or more rules.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
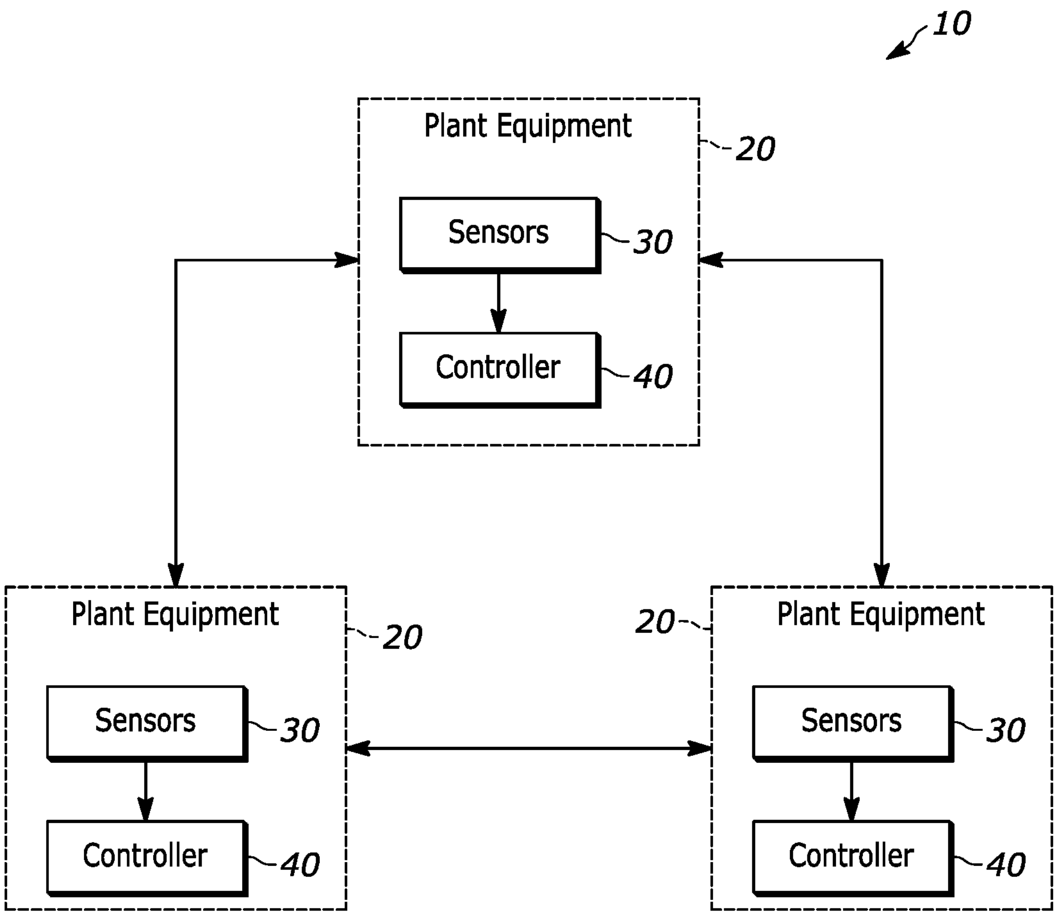
FIG. 1A is a functional block diagram illustrating a manufacturing a production plant in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, a maintenance strategy is employed at a production plant, such as a production plant for the production of automotive vehicles, to monitor the condition of plant equipment provided at the production plant. The plant equipment may include at least one of a machine or a plant asset, such as a drive motor, a pump, a gear box, etc. An existing maintenance strategy for preventive maintenance (PM) may be based on route-based vibration monitoring routines. According to the route-based vibration monitoring routine, vibration sensors are temporarily mounted on the plant equipment to collect vibration data associated with a given piece of plant equipment for a period of time before relocating the vibration sensors to the next piece of plant equipment according to a predefined route. The predefined route refers to the order in which the vibration data is collected for each piece of plant equipment. The vibration data may be collected periodically after a predefined interval, which may be, for example, a month or one quarter of a year. After the collection of the vibration data, a vibration operator analyzes the vibration data of each piece of plant equipment is analyzed to determine faults associated with the plant equipment. Based on the analysis, PM is performed to repair the plant equipment for inhibiting the failure of the plant equipment in future.

During the route-based vibration monitoring routine, the normal operation of the plant equipment at the production plant is affected. Thus, the route-based vibration monitoring is highly production-intrusive. Further, relocating the vibration sensors after collecting the vibration data of each plant equipment is a labor-intensive process. Thus, the route-based vibration monitoring routine consumes significant amounts of time and resources. Additionally, since the route-based vibration monitoring routine is implemented periodically, several issues associated with the plant equipment may develop in a shorter time than the predefined time interval for collection of vibration data. In such a case, the vibration data of the plant equipment is not collected in a timely manner. Such issues may result in the failure of the plant equipment before the vibration data is collected. Further, due to the maintenance and repair workloads, the route-based vibration monitoring maintenance strategy may not be prioritized.

To overcome the disadvantages associated with the existing route-based vibration monitoring maintenance strategy, an existing maintenance strategy for predictive maintenance (PdM) employs mount sensors, wireless data transmission protocols, and cloud-based analytics for automating the maintenance of the plant equipment. The plant equipment at the production plant may include machines from different original equipment manufacturers (OEMs). Alternatively, the plant equipment at the production plant may include one or more assets from different OEMs incorporated in machines at the production plant. Different types of sensors or sensors from different OEMs are mounted on the plant equipment from different OEMs to monitor the condition of the plant equipment. Data sensed by a sensor mounted on a plant equipment is communicated through wireless data transmission protocols to an analytics platform provisioned for an application for the plant equipment. The analytics platform performs cloud-based analytics on the sensed data based on a data flow system. A result of the cloud-based analytics is presented on a user interface of a hardware setup at the production plant. The presented result may include various parameters based on the type of sensor. The presented result is interpreted by an operator having knowledge of the parameters and the data flow system for the sensor.

As per the existing maintenance strategy, there are different data flow systems, different analytics platforms, different hardware and software setups, different user interfaces, and different parameters for each type of sensor utilized at the production plant. Working on multiple and different hardware setups is challenging and inefficient for the operators working at the production plant since the operators may desire to understand the parameters and the data flow system for each type of sensor.

The present subject matter describes a method for monitoring a plurality of plant equipment deployed at a production plant, such as a production plant for the production of automotive vehicles. According to the method of the present disclosure, unprocessed data is received through data signals from a plurality of sensors mounted on the plurality of plant equipment. Further, the received unprocessed data is normalized. Based on the normalized data and a change index routine, an anomaly in the performance of each plant equipment is detected. Further, the unprocessed data is converted to a frequency domain. Based on a pattern of the frequency domain data, a primary cause of the detected anomaly is determined.

The present subject matter provides a condition-based maintenance routine where the condition of the plurality of plant equipment is continuously monitored by the plurality of sensors mounted on the plurality of plant equipment. By normalizing the unprocessed data received from different types of sensors or sensors from different OEMs, the routines described herein provide a uniform, consistent, and common platform for collection, processing, and analysis of data received from the sensors from different OEMs or the different types of sensors. Thus, the methodology of the present disclosure is sensor agnostic, which indicates that the routines are applicable to all the sensors that are capable of transmitting unprocessed data irrespective of the sensor's OEM, type, configuration, etc. As a result, a common output may be reported to an interface of a hardware setup deployed at the production plant. The common output enables improved monitoring of the plant equipment, and prompt and seamless feedback for the workers at the production plant. Further, the methodology of the present subject matter inhibits the unscheduled cessation of the production, improves mean time before failure (MTBF), inhibits mean time to recovery, repair, respond, or resolve (MTTR), and provides an overall efficient predictive maintenance strategy. According to the present disclosure, a primary cause of the detected anomaly is determined, and data analytics may also be performed across different plant equipment of the same model and different production plants.

The description hereinafter describes a method for monitoring a plurality of plant equipment deployed at a production plant, such as a production plant for the production of automotive vehicles. The manner in which the method of the present disclosure is employed is described below in further detail with reference to FIGS. 1 to 3.

It should be noted that the description and figures merely illustrate the principles of the present disclosure. It will thus be appreciated that those skilled in the art will be able to devise various arrangements that, although not explicitly described herein, embody the principles of the present disclosure and are included within its scope. Furthermore, all examples recited herein are intended to aid the reader in understanding the principles of the present disclosure. Moreover, all statements herein reciting principles, aspects and implementations of the present subject matter, as well as specific examples thereof, are intended to encompass equivalents thereof.

The present subject matter describes a method for monitoring a plurality of plant equipment deployed at a production plant, in accordance with an implementation of the present disclosure. Various operations for monitoring a plurality of plant equipment deployed at a production plant, detecting an anomaly in the performance of each plant equipment, and determining a primary cause of the detected anomaly may be performed by a device having a processor. The device may also include a memory and a communication interface coupled to the processor. It will be appreciated that additional components may also be a part of the device in certain forms, and in certain forms fewer components may be used.

FIG. 1A illustrates a plurality of plant equipment 20 deployed at a production plant 10, such as a production plant for the production of automotive vehicles. In an example form, the plurality of plant equipment 20 may include machines from different OEMs. In another example form, the plurality of plant equipment 20 may include assets from different OEMs incorporated in machines at the production plant 10. The plant equipment 20 may be a drive motor, a pump, a gearbox, a fan, a conveyor, a robot arm, etc., deployed at the production plant.

The production plant 10 may include a plurality of sensors 30 mounted on the plurality of plant equipment 20. The plurality of sensors 30 may include a vibration sensor, a pressure sensor, a noise sensor, a gas sensor, among others. Furthermore, the plurality of sensors 30 may be provided by sensors from different OEMs. In an example form, a sensor 30 may be mounted on the plant equipment 20 to monitor the vibration of the plant equipment 20 in the axial and radial directions. In one form, any number of sensors 30 may be mounted on a given plant equipment 20. It should be understood that the sensors 30 may not be mounted on the given plant equipment 20 when performing the functionality described herein.

The production plant 10 may include a controller 40. The controller 40 is configured to control the operation of and monitor the plant equipment 20. As an example, the controller 40 is provided by a programmable logic controller (PLC), but it should be understood that the controller 40 may be provided by other types of controllers and is not limited to the example described herein. To perform the functionality described herein, the controller 40 may include one or more processors configured to execute instructions stored in a nontransitory computer-readable medium. Additional details regarding the controller 40 are provided below.

Figure 1B:
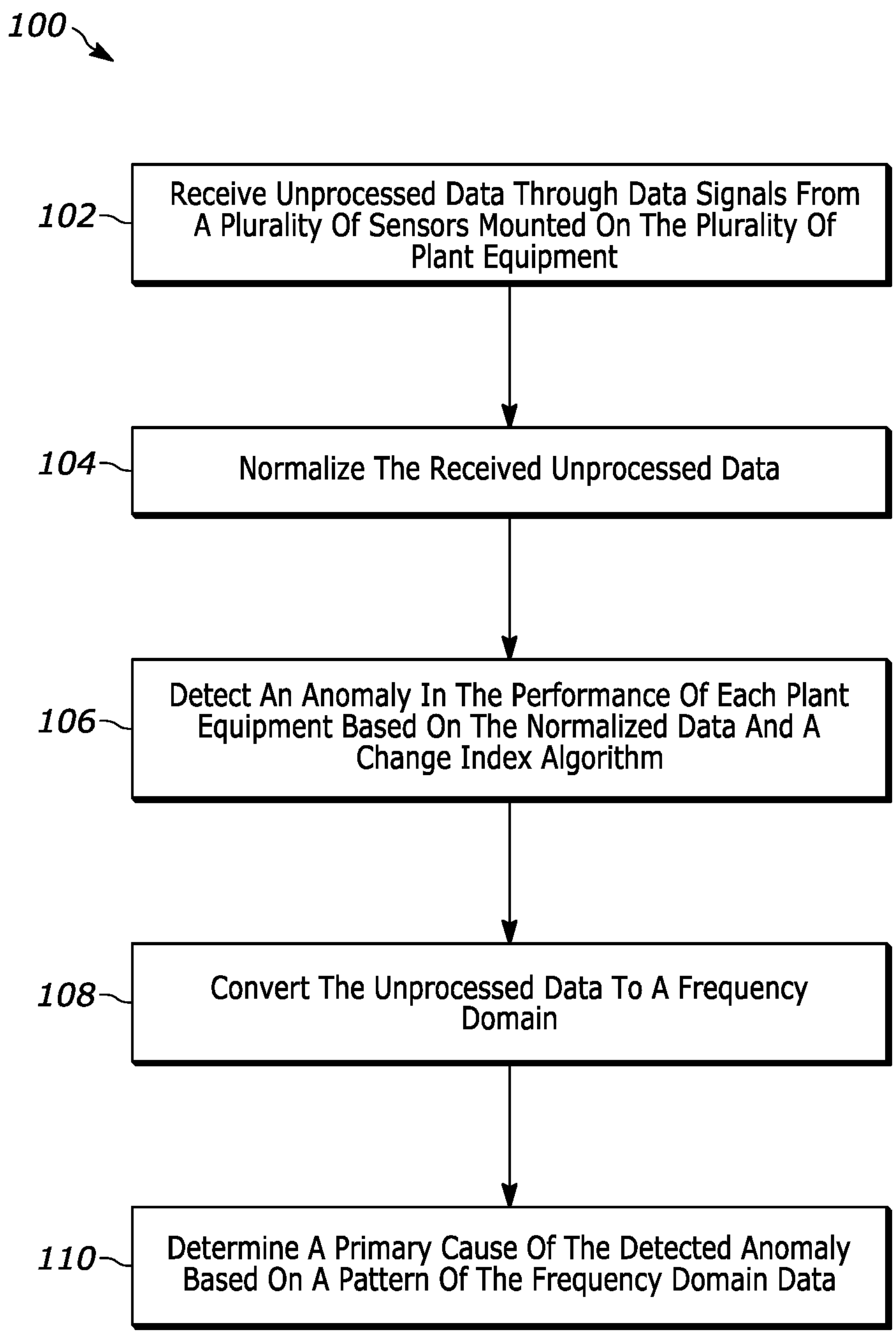
FIG. 1B is a flowchart illustrating a method for monitoring a plurality of plant equipment deployed at a production plant in accordance with the teachings of the present disclosure.

FIG. 1B illustrates a routine 100 for monitoring the plurality of plant equipment 20 deployed at the production plant 10. The controller 40, at block 102, receives unprocessed data through data signals from the plurality of sensors 30 mounted on the plurality of plant equipment 20. The data signals may be transmitted by the plurality of sensors 30 through the use of wireless transmission protocols. Further, each of the plurality of sensors may utilize a networking protocol for transmitting the data signals. The networking protocol may include networking protocols for an Ethernet network, a Wireless Fidelity (Wi-Fi) network, a cellular network, a Bluetooth® network, etc. In one form, the unprocessed data may also include data from a dataset stored in a PLC (as the controller 40) deployed at the production plant 10.

The controller 40, at block 104, normalizes the received unprocessed data. Normalization of the unprocessed data transforms the engineering or voltage unit based digitized data into a domain that is agnostic to accommodate the data signals of any type of sensor and the controller 40.

The controller 40, at block 106, detects an anomaly in the performance of each plant equipment 20 based on the normalized data and a change index routine. The change index routine employs statistical and machine learning techniques for detecting the anomaly in the performance of each plant equipment 20 based on the normalized data. The normalized data may include root mean square (RMS) values of the velocity, RMS values of the acceleration, peak values of the velocity, and/or peak values the acceleration for the plant equipment 20 (as indicated by the sensors 30).

The controller 40, at block 108, converts the unprocessed data to a frequency domain. In an example form, the frequency domain data may include acceleration frequency domain data and velocity frequency domain data.

The controller 40, at block 110, determines a primary cause of the detected anomaly based on a pattern of the frequency domain data.

Figure 2:
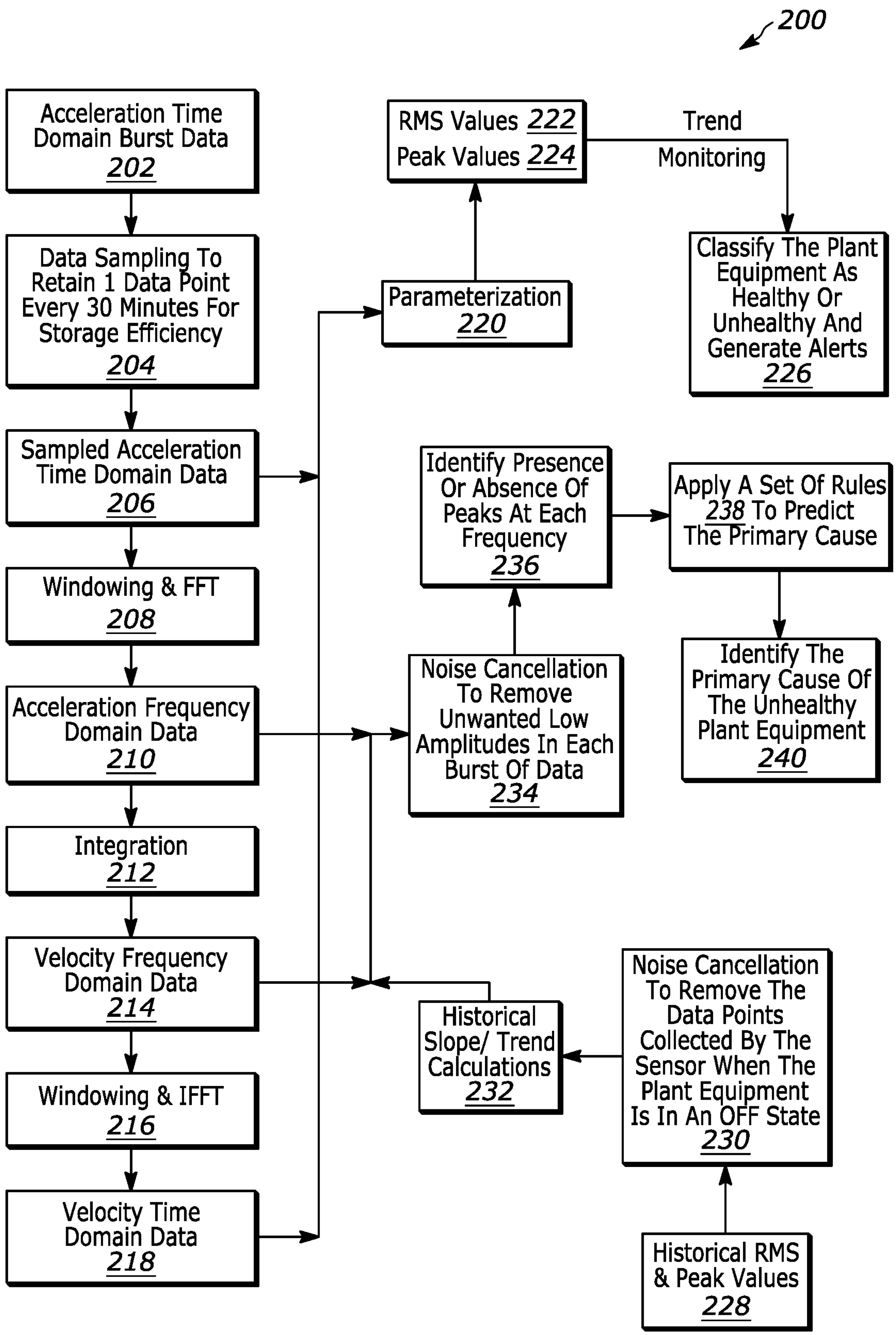
FIG. 2 illustrates a data flow system for detecting an anomaly in the performance of each plant equipment and determining a primary cause of the detected anomaly in accordance with the teachings of the present disclosure.

FIG. 2 illustrates a routine 200 for detecting an anomaly in the performance of each plant equipment 20 and determining the primary cause of the detected anomaly. In an example form, acceleration time domain burst data 202 may be the unprocessed data received from the sensor 30 mounted on the plant equipment 20.

At block 204, the controller 40 performs a data sampling routine on the acceleration time domain burst data 202 to retain one data point every 30 minutes for storage efficiency. It should be understood that other time periods for retaining the one data point may be employed and is not limited to the example described herein. When the controller 40 performs the data sampling routine at the block 204, the controller 40 obtains sampled acceleration time domain data 206.

At block 208, the controller 40 performs windowing and Fast Fourier transform (FFT) routines on the sampled acceleration time domain data 206. When the controller 40 performs the windowing and FFT routines at block 208, the controller 40 obtains acceleration frequency domain data 210.

At block 212, the controller 40 integrates the acceleration frequency domain data 210. When the controller 40 performs the integration at block 212, the controller 40 obtains velocity frequency domain data 214.

At block 216, the controller 40 performs windowing and Inverse Fast Fourier transform (IFFT) on the velocity frequency domain data 214. When the controller 40 performs the windowing and IFFT at the block 216, the controller 40 obtains velocity time domain data 218.

At block 220, the controller 40 performs parameterization on the sampled acceleration time domain data 206 and the velocity time domain data 218. When the controller 40 performs the parameterization at block 220, the controller 40 obtains the RMS values 222 of the acceleration and the velocity and peak values 224 of the acceleration and the velocity.

At block 226, the controller 40 classifies a plant equipment 20 as unhealthy if the controller 40 detects an anomaly in the performance of the plant equipment 20 based on trend monitoring routine performed by the controller 40 on the RMS values 222 and the peak values 224. Further, the controller 40 classifies a plant equipment 20 as healthy if the controller 40 does not detect an anomaly in the performance of the plant equipment 20 based on the trend monitoring routine performed by the controller 40 on the RMS values 222 and the peak values 224. The trend monitoring routine may be a change index routine that employs statistical and machine learning techniques for detection of anomalies from the RMS values 222 and the peak values 224. The controller 40 may automatically generate a threshold for the classification of the plant equipment as healthy or unhealthy based on the statistical and machine learning techniques.

Further, at the block 226, the controller 40 generates an alert according to the classification of the plant equipment 20. In an example form, the alert may include a warning. The controller 40 may automatically determine a threshold for generating the warning based on the statistical and machine learning techniques. In an example form, the alert may be presented on a user interface of a hardware setup deployed at the production plant 10. In an example form, the alert may be sent to a mobile device of a user through an electronic mail, a text message, or the like.

To determine a primary cause of the detected anomaly, the controller 40 may retrieve historical RMS and peak values 228 from the nontransitory computer-readable medium of the controller 40 (e.g., a memory of the controller 40).

At block 230, the controller 40 performs noise cancellation routines on the historical RMS and peak values 228 to remove the data points that are collected by the sensor 30 when the plant equipment 20 is in an OFF state. When the controller 40 performs the noise collection at the block 230, the controller 40 obtains the historical slope or trend calculations 232.

At block 234, the controller 40 performs noise cancellation routines on the acceleration frequency domain data 210, the velocity frequency domain data 214, and the historical slope or trend calculations 232 to remove unwanted low amplitudes in each burst of data.

At block 236, the controller 40, after performing the noise cancellation routines, identifies the presence or absence of peaks at each frequency. Then, the controller 40 applies a set of rules 238 to predict the primary cause for the detected anomaly. Additional details regarding the set of rules 238 are provided below with reference to FIG. 3. At block 240, the controller 40 identifies the primary cause of the unhealthy plant equipment.

Figure 3:
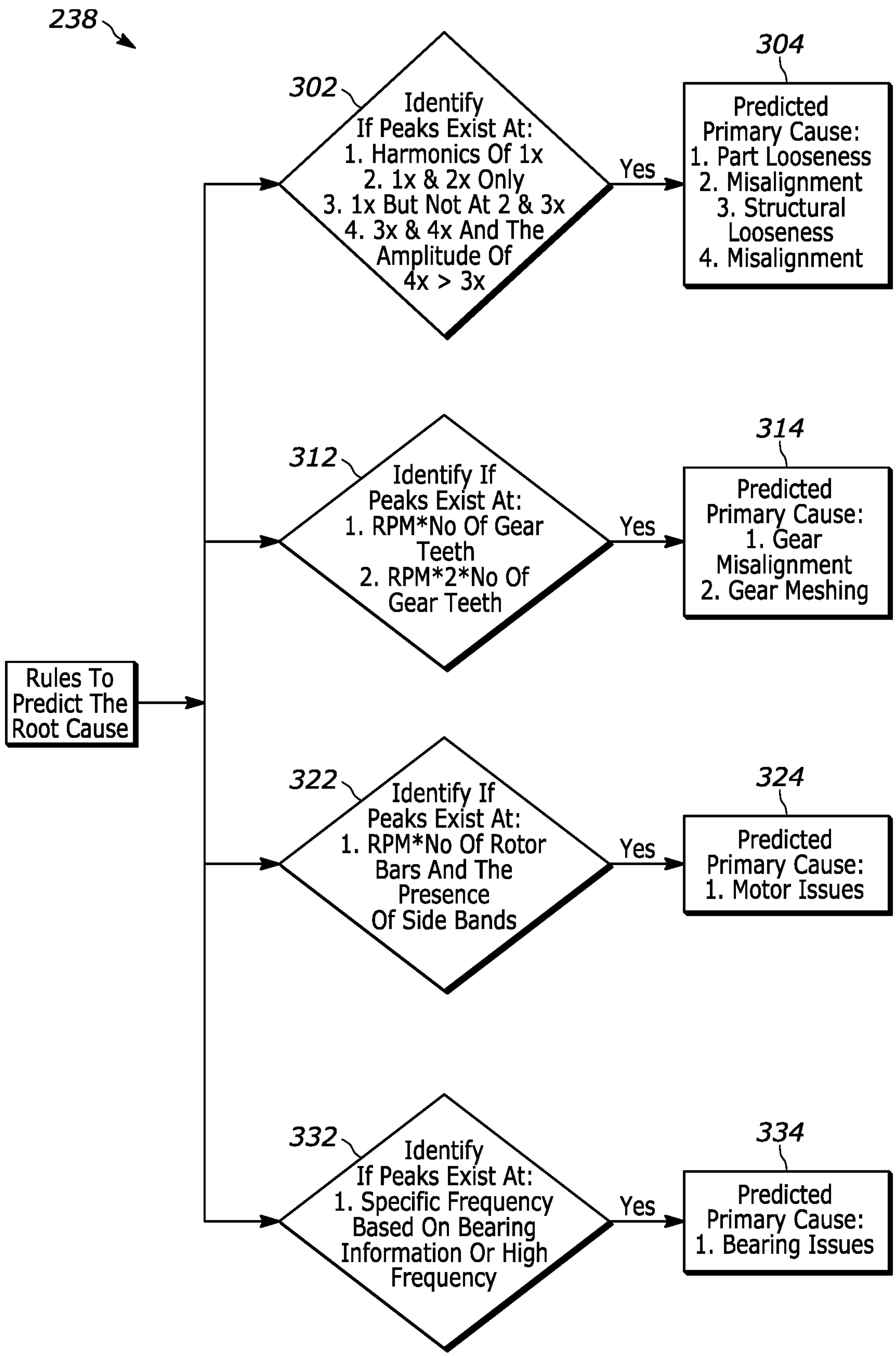
FIG. 3 illustrates a set of rules to predict the primary cause for the detected anomaly in accordance with the teachings of the present disclosure.

FIG. 3 illustrates a set of rules 238 employed by the controller 40 to predict the primary cause for the detected anomaly of the unhealthy plant equipment 20. "X" in FIG. 3 represents the revolutions per minute (RPM) of the plant equipment 20 on which the sensor 30 is mounted. As illustrated by blocks 302 and 304 of FIG. 3, if peaks exist at harmonics of 1× (i.e., the fundamental frequency), then the controller 40 predicts the primary cause as a looseness of a part of the plant equipment 20. If peaks exist at harmonics of 1× and 2× only (i.e., the fundamental frequency and the second harmonic), then the controller 40 predicts the primary cause as a misalignment of the plant equipment 20. If peaks exist at harmonics of 1× but not at the harmonics of 2× and 3× (i.e., the second and third harmonics), then the controller 40 predicts the primary cause as a structural looseness of the plant equipment 20. If peaks exist at harmonics of 3× and 4× (i.e., the third and fourth harmonics) and the amplitude of the peak at 4× is greater than the amplitude of the peak at 3×, then the controller 40 predicts the primary cause as a misalignment of the plant equipment 20.

Further, as illustrated by blocks 312 and 314 of FIG. 3, if peaks exist at RPM multiplied by a number of gear teeth, then the controller 40 predicts the primary cause as a gear misalignment. If peaks exist at double of RPM multiplied by a number of gear teeth, then the controller 40 predicts the primary cause as a gear meshing.

Further, as illustrated by blocks 322 and 324 of FIG. 3, if peaks exist at RPM multiplied by a number of rotor bars and at the presence of the side bands, then the controller 40 predicts the primary cause as a motor issue.

Further, as illustrated by blocks 332 and 334 of FIG. 3, if peaks exist at a specific frequency based on bearing information or at a high frequency, then the controller 40 predicts the primary cause as a bearing issue.

The routines performed by the controller 40 identify multiple faults associated with the plant equipment 20. In a case where the plurality of sensors 30 is mounted on the plant equipment 20, the controller 40 may detect the same primary cause on different sensors 30 mounted on the same plant equipment 20 based on the nature of the primary cause. In such a case, the methodology of the present disclosure distinguishes and identifies unique primary causes based on the data signals.

The present subject matter describes a condition-based maintenance routine where the condition of the plurality of plant equipment 20 is continuously monitored by the plurality of sensors 30 mounted on the plurality of plant equipment 20. The methodology provides for comprehensive controls and routines for data processing routines and analytic solution sets. Further, the methodology of the present subject matter provides a software routines where machine learning can be employed for prescriptive maintenance recommendations. Further, the methodology of the present disclosure provides a routines where integrated output functionality may be provided to systems, such as a dashboard, maintenance work order tickets, alerts for users, etc., of the production plant 10.

By normalizing the unprocessed data received from different types of sensors 30 or sensors 30 from different OEMs, the routines of the present disclosure provides a uniform, consistent, and common platform for collection, processing, and analysis of data received from the sensors 30 from different OEMs or the different types of sensors 30. Thus, the routines of the present disclosure are sensor agnostic, which indicates that the present disclosure is applicable to all the sensors 30 that are capable of transmitting unprocessed data irrespective of the sensor's OEM, type, configuration, etc. As a result, the controller 40 may report a common output to an interface of a hardware setup deployed at the production plant 10. The common output provides improved monitoring of the plant equipment, and prompt and seamless feedback for the operators at the production plant 10. Further, the routines of the present disclosure inhibits the unscheduled cessation of the production, improves mean time before failure (MTBF), inhibits mean time to recovery, repair, respond, or resolve (MTTR), and provides an overall efficient predictive maintenance strategy. According to the present disclosure, the controller 40 may determine a primary cause of the detected anomaly and perform data analytics across different plant equipment of the same model and different production plants 10.

The routines of the present disclosure provide a common platform to receive, process, analyze, and save data from individual monitoring systems and control gateways. The routines of the present disclosure may provide top fault for the plant equipment. Further, the controller 40 may display the latest trend charts for the selected plant equipment 20, time or frequency domain profiles for the selected plant equipment 20, and the generated open or closed maintenance tickets.

The present disclosure provides a common data model (CDM) to enable uniform and consistent data flow from various commercially available sensors 30, monitoring systems, gateways, and OEM integrated solutions to information technology systems of the production plant 10. The individual monitoring systems may have a data format at the machine level, but also may output relevant data to a networked system in the CDM. The CDM of the present disclosure defines the schema of such a data protocol for monitoring a plurality of plant equipment 20 deployed at the production plant 10, detecting an anomaly in the performance of each plant equipment 20, and determining a primary cause of the detected anomaly. The obtained results are output in a CDM format. The controller 40 may generate the maintenance work orders automatically. Further, the controller 40 may provide a machine data feedback to the operators at the production plant 10 to provide for informed decision making. Further, the controller 40 may provide a prescriptive maintenance feedback with specific root cause identification with corresponding probability percentage and ranking of various potential primary causes.

While this detailed description has disclosed certain specific forms for illustrative purposes, various modifications will be apparent to those skilled in the art, and it is to be distinctly understood that the foregoing descriptive matter is to be interpreted merely as illustrative of the disclosure and not as a limitation. The method described herein may be performed by a device having a processor, a memory and a communication interface.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

obtaining unprocessed data from a plurality of sensors mounted on one or more plant equipment;

normalizing the unprocessed data to generate normalized data;

converting the unprocessed data from a time domain to a frequency domain to generate a frequency domain signal;

detecting a performance anomaly associated with the one or more plant equipment based on the normalized data and a machine learning model;

identifying one or more causes of the performance anomaly based on the frequency domain signal;

determining a primary type of cause from among the one or more causes of the performance anomaly based on the frequency domain signal and a plurality of rules that correlate different frequency characteristics of the frequency domain signal to different types of the one or more causes; and performing a corrective action on the one or more plant equipment based on the primary cause.

2. The method of claim 1 further comprising identifying one or more harmonic peaks of the frequency domain signal, wherein the plurality of rules are further based on the one or more harmonic peaks.

3. The method of claim 2, wherein in response to the one or more harmonic peaks corresponding to a fundamental frequency, the primary type of cause is associated with a looseness of a part of the one or more plant equipment.

4. The method of claim 2, wherein in response to the one or more harmonic peaks corresponding to a fundamental frequency and a second harmonic, the primary type of cause is associated with a misalignment of the one or more plant equipment.

5. The method of claim 2, wherein in response to the one or more harmonic peaks corresponding to only a fundamental frequency, the primary type of cause is associated with a structural looseness of a part of the one or more plant equipment.

6. The method of claim 2, wherein in response to (i) the one or more harmonic peaks corresponding to a third harmonic and a fourth harmonic and (ii) an amplitude of the fourth harmonic is greater than an amplitude of the third harmonic, the primary type of cause is associated with a misalignment of the one or more plant equipment.

7. The method of claim 2, wherein in response to the one or more harmonic peaks corresponding to a number of gear teeth, the primary type of cause is associated with one of a gear misalignment and a gear meshing of the one or more plant equipment.

8. The method of claim 2, wherein in response to the one or more harmonic peaks corresponding to a number of rotor bars, the primary type of cause is associated with a motor issue of the one or more plant equipment.

9. The method of claim 2, wherein in response to the one or more harmonic peaks corresponding to a harmonic associated with a predetermined frequency, the primary type of cause is associated with a bearing issue of the one or more plant equipment.

10. The method of claim 1, wherein the normalized data includes at least one of a root mean square (RMS) velocity value, an RMS acceleration value, a peak velocity value, and a peak acceleration value, or a combination thereof.

11. The method of claim 1 further comprising performing a noise cancellation routine on the unprocessed data to generate the normalized data.

12. The method of claim 1, wherein the unprocessed data includes at least one of velocity data and, acceleration data.

13. The method of claim 1, further comprising detecting the performance anomaly based on statistical model.

14. A system comprising:

one or more processors and one or more nontransitory computer-readable mediums storing instructions that are executable by the one or more processors, wherein the instructions comprise:

obtaining unprocessed data from a plurality of sensors mounted on one or more plant equipment;

normalizing the unprocessed data to generate normalized data;

converting the unprocessed data from a time domain to a frequency domain to generate a frequency domain signal;

identifying one or more harmonic peaks of the frequency domain signal;

detecting a performance anomaly associated with the one or more plant equipment based on the normalized data and a machine learning model;

determining a primary type of cause from among one or more causes of the performance anomaly based on the one or more harmonic peaks and a plurality of rules that correlate different frequency characteristics of the frequency domain signal to different types of the one or more causes; and performing a corrective action on the one or more plant equipment based on the primary cause.

15. The system of claim 14, wherein the instructions further comprise:

in response to the one or more harmonic peaks corresponding to a fundamental frequency, the primary type of cause is associated with a looseness of a part of the one or more plant equipment.

16. The system of claim 14, wherein the instructions further comprise:

in response to the one or more harmonic peaks corresponding to a fundamental frequency and a second harmonic, the primary type of cause is associated with a misalignment of the one or more plant equipment.

17. The system of claim 14, wherein the instructions further comprise:

in response to the one or more harmonic peaks corresponding to only a fundamental frequency, the primary type of cause is associated with a structural looseness of a part of the one or more plant equipment.

18. The system of claim 14, wherein the instructions further comprise:

in response to (i) the one or more harmonic peaks corresponding to a third harmonic and a fourth harmonic and (ii) an amplitude of the fourth harmonic is greater than an amplitude of the third harmonic, the primary type of cause is associated with a misalignment of the one or more plant equipment.

19. The system of claim 14, wherein the instructions further comprise:

in response to the one or more harmonic peaks corresponding to a number of gear teeth, the primary type of cause is associated with one of a gear misalignment and a gear meshing of the one or more plant equipment; and in response to the one or more harmonic peaks corresponding to a number of rotor bars, the primary type of cause is associated with a motor issue of the one or more plant equipment.

20. The system of claim 14, wherein the instructions further comprise:

in response to the one or more harmonic peaks corresponding to a harmonic associated with a predetermined frequency, the primary type of cause is associated with a bearing issue of the one or more plant equipment.

* * * * *